US012353171B2

(12) United States Patent
Benoist et al.

(10) Patent No.: US 12,353,171 B2
(45) **Date of Patent: *Jul. 8, 2025**

(54) TIMEPIECE COMPRISING A VIBRATION-AMPLIFYING DEVICE

(71) Applicant: PATEK PHILIPPE SA GENEVE, Geneva (CH)

(72) Inventors: Quentin Benoist, Grand-Lancy (CH); Sylvain Geiser, St-Cergue (CH); Eric Le Gall, Nyon (CH); Alessandro Vandini, Tannay (CH)

(73) Assignee: PATEK PHILIPPE SA GENEVE, Geneva (CH)

( * ) Notice: Subject to any disclaimer, the term of this patent is extended or adjusted under 35 U.S.C. 154(b) by 496 days.

This patent is subject to a terminal disclaimer.

(21) Appl. No.: 17/770,550

(22) PCT Filed: Oct. 23, 2020

(86) PCT No.: PCT/EP2020/079950
§ 371 (c)(1),
(2) Date: Apr. 20, 2022

(87) PCT Pub. No.: WO2021/078968
PCT Pub. Date: Apr. 29, 2021

(65) Prior Publication Data

US 2022/0382217 A1 Dec. 1, 2022

(30) Foreign Application Priority Data

Oct. 25, 2019 (EP) .................................... 19205438

(51) Int. Cl.
*G04B 23/12* (2006.01)
*G04B 23/02* (2006.01)
*G04B 37/00* (2006.01)

(52) U.S. Cl.
CPC ........... *G04B 23/12* (2013.01); *G04B 23/028* (2013.01); *G04B 37/0075* (2013.01)

(58) Field of Classification Search
CPC .................................................. G04B 37/0075
See application file for complete search history.

(56) References Cited

U.S. PATENT DOCUMENTS 576,180 A 2/1897 Woodworth
2,679,134 A 5/1954 Marshall
2,709,332 A * 5/1955 Friedrich .............. G04B 5/245 968/67

FOREIGN PATENT DOCUMENTS

DE 1458431 2/1939
DE 1 497 838 6/1969
(Continued)

OTHER PUBLICATIONS

Translation of EP364133, Espacenet (Year: 2020).*
(Continued)

*Primary Examiner* — Renee S Luebke
*Assistant Examiner* — Matthew Daniel Hwang
(74) *Attorney, Agent, or Firm* — NIXON & VANDERHYE

(57) ABSTRACT

Disclosed is a timepiece including a case, a movement and a vibration-generating device intended to produce a sound, the latter two accommodated in the case, a device for amplifying the vibrations from the vibration-generating device, and a membrane receiving the amplified vibrations and generating a sound to outside the timepiece. The vibration-amplifying device includes a lever pivotally mounted on a support in a pivoting plane non-parallel to the plane of the membrane and actuated by a transmission member cooperating with the vibration-generating device to transmit the vibrations to the lever, the lever being integral with the membrane at least translationally in the pivoting plane so a (Continued)

movement of the transmission member, generated by vibration of the transmission member linked to the vibration-generating device and transmitted to the membrane by way of the lever actuated by the transmission member, generates an amplified movement of the membrane for an amplified sound.

17 Claims, 5 Drawing Sheets

(56) References Cited

FOREIGN PATENT DOCUMENTS

| | | | | |
|---|---|---|---|---|
| EP | 3 525 045 | | 8/2019 | |
| EP | 3644133 A1 | * | 4/2020 | ............ G04B 21/00 |
| FR | 990766 A | * | 9/1951 | |

OTHER PUBLICATIONS

Translation of FR990766, Espacenet (Year: 1951).*

International Search Report and Written Opinion of the International Searching Authority dated Jan. 26, 2021, in connection with corresponding International Application No. PCT/EP2020/079950, 16 pp., including English translations.

* cited by examiner

TIMEPIECE COMPRISING A VIBRATION-AMPLIFYING DEVICE

This application is the U.S. national phase of International Application No. PCT/EP2020/079950 filed Oct. 23, 2020, which designated the U.S. and claims priority to EP 19205438.5 filed Oct. 25, 2019, the entire contents of each of which are hereby incorporated by reference.

BACKGROUND OF THE INVENTION

Field of the Invention

The present invention relates to a timepiece comprising a case having a middle, a back cover and a bezel, a movement and a vibration-generating device intended to produce at least one sound, the latter two accommodated in said case, a device for amplifying the vibrations generated by said vibration-generating device, and a membrane arranged to receive said amplified vibrations and generate a sound from the inside to the outside of the timepiece.

Description of the Related Art

Such a timepiece is for example a watch with a striking-mechanism (such as a minute-repeater, grande sonnerie, petite sonnerie, alarm) for which the vibration-generating device is for example a gong arranged to be struck by a hammer when striking is initiated to generate vibrations in order produce a sound. The gong conventionally takes the form of a strip spring wound around the movement. The gong is mounted integral with the watch frame (the bottom plate and bridge assembly) by way of a heel or gong holder, in order to transmit the vibrations of the gong to the entire watch (frame, movement, external parts). The vibrations of the gong are thus transmitted to the wearer of the watch with maximum intensity.

Since the transmission of sound is obtained by setting the entire watch in vibration, it has been proposed to stiffen the various elements of the watch in order to assist the vibration of these elements and so improve said sound transmission.

This solution has provided satisfactory results in terms of sound transmission quality but has brought about other problems, such as the appearance of unwanted sounds. This is because, the greater the sound intensity, the more the movement vibrates, and the more the various movement components generate noise by vibrating. These vibrations combine to generate unwanted noises.

One solution for amplifying sound is to increase the force with which the hammer strikes on its gong. This has made it possible to increase the sound level but the quality of the sound was degraded by the unwanted noises.

The timepiece described in application EP 3 525 045 proposes solving this problem by using a sound transmission bridge mounted on the bottom plate or more generally on a frame element, said transmission bridge also being in contact with a membrane fixed to the watch-case middle. Thus, when the gong vibrates, said gong itself being mounted integrally with the frame, the sound transmission bridge also vibrates in the same manner and transmits this same vibration to the membrane. Due to its rigidity and its surface area, the transmission bridge contributes to significant air displacement, which improves the intensity and quality of the sound. Furthermore, since the transmission bridge can be integral with frame elements other than the bottom plate, it may transmit vibrations originating from other frame elements around other movement components to the membrane.

However, vibrations of various movement components due to frame vibrations remain, so that unwanted noises still occur.

SUMMARY OF THE INVENTION

The present invention is directed at overcoming these drawbacks by proposing a timepiece comprising a vibration-generating device intended to produce at least one sound and a device for amplifying these vibrations which allow said generated sound to be amplified significantly.

A further object of the present invention is to enable amplification of the generated sound without unwanted noise, or at least with limitation of said unwanted noises.

To this end, the present invention relates to a timepiece comprising a case having a middle, a back cover and a bezel, a movement and a vibration-generating device intended to produce at least one sound, the latter two accommodated in said case, a device for amplifying the vibrations generated by said vibration-generating device, and a membrane arranged to receive said amplified vibrations and generate a sound from the inside to the outside of the timepiece.

According to the invention, the vibration-amplifying device comprises a lever pivotally mounted on a support in a pivoting plane non-parallel to the plane of the membrane and arranged to be actuated by a transmission member cooperating with the vibration-generating device to transmit the vibrations to the lever, said lever likewise being integral with the membrane at least translationally in the pivoting plane such that a movement of the transmission member, generated by the vibration of said transmission member linked to the vibration-generating device and transmitted to the membrane by way of the lever actuated by said transmission member, generates an amplified movement of said membrane, so as to generate an amplified sound.

Thus, thanks to the amplification device used in the present invention, the generated vibrations are recovered on the lever which is arranged so as to amplify said vibrations mechanically before transmitting them to the membrane, producing a first amplification of the sound.

Preferably, the vibration-amplifying device is isolated from the movement such that no vibration is transmitted to movement and/or frame elements (bottom plate and bridges). Furthermore, since the membrane is preferably advantageously located outside the movement, and in particular in the bezel or in the back cover of the timepiece, the membrane is itself isolated from the movement, such that none of the vibrations transmitted to the membrane are dissipated in the movement. Thus, the timepiece according to the invention generates little, or even no, unwanted noise associated with vibrations of movement and/or frame elements. Since all the vibrations are directed onto the membrane without transmission to one of the movement and/or frame elements, it is then possible, in the case of a striking-mechanism, to modify the gong striking power, without having any impact on the vibration of the movement and/or frame elements.

Advantageously, a compression chamber is provided which is arranged to amplify the sound which has been generated by the movement of the membrane before it emerges to the outside.

This makes it possible to generate a second amplification of the sound.

Thus, the timepiece according to the invention makes it possible to produce significantly amplified sounds with little, or even no, unwanted noise.

BRIEF DESCRIPTION OF THE DRAWINGS

Other features and advantages of the present invention will become apparent from reading the following detailed description of various embodiments of the invention provided by way of non-limiting example, the description being made with reference to the appended drawings in which.

DESCRIPTION OF THE PREFERRED EMBODIMENTS

The present invention relates to a timepiece comprising a case having a middle, a back cover and a bezel, a movement and a vibration-generating device intended to produce at least one sound, the latter two accommodated in said case, a device for amplifying the vibrations generated by said vibration-generating device, and a membrane arranged to receive said amplified vibrations and generate a sound from the inside to the outside of the timepiece. According to the invention, said vibration-amplifying device comprises a lever pivotally mounted on a support in a pivoting plane non-parallel to the plane of the membrane and arranged to be actuated by a transmission member cooperating with the vibration-generating device to transmit the vibrations to the lever, said lever likewise being integral with the membrane at least translationally in the pivoting plane, the actuation point of the lever, the pivoting point of the lever and the link point of the lever with the membrane being positioned such that a movement of the transmission member, generated by the vibration of said transmission member linked to the vibration-generating device, is transmitted to the membrane by way of the lever, which is actuated by said transmission member, in amplified manner by the lever arm effect of said lever.

The vibration-generating device may be a strike-gong arranged to be struck by a strike-hammer, said strike-gong being integral with the transmission member, and said transmission member being integral with the lever.

In another variant, the vibration-generating device may be a rotating disc comprising an engraved groove arranged to generate a sound, the transmission member being a needle integral with the lever and arranged to follow the groove on the disc.

In another variant, the vibration-generating device may be a musical box comprising vibrating blades fixed by studs, the transmission member being integral with said studs and the lever.

In the following description, the vibration-generating device is a strike-gong struck by a strike-hammer such that the timepiece comprises a striking-mechanism for indicating time (minute-repeater, grande sonnerie, petite sonnerie) or for striking at a predefined moment in time (alarm). The timepiece is preferably a watch, and more preferably a wristwatch intended to be worn on a user's wrist.

Unless specifically indicated, the remainder of the description of the invention, in particular of the vibration-amplifying device, will apply identically to a watch comprising a rotating disc read by a needle or a musical box.

Figure 1:
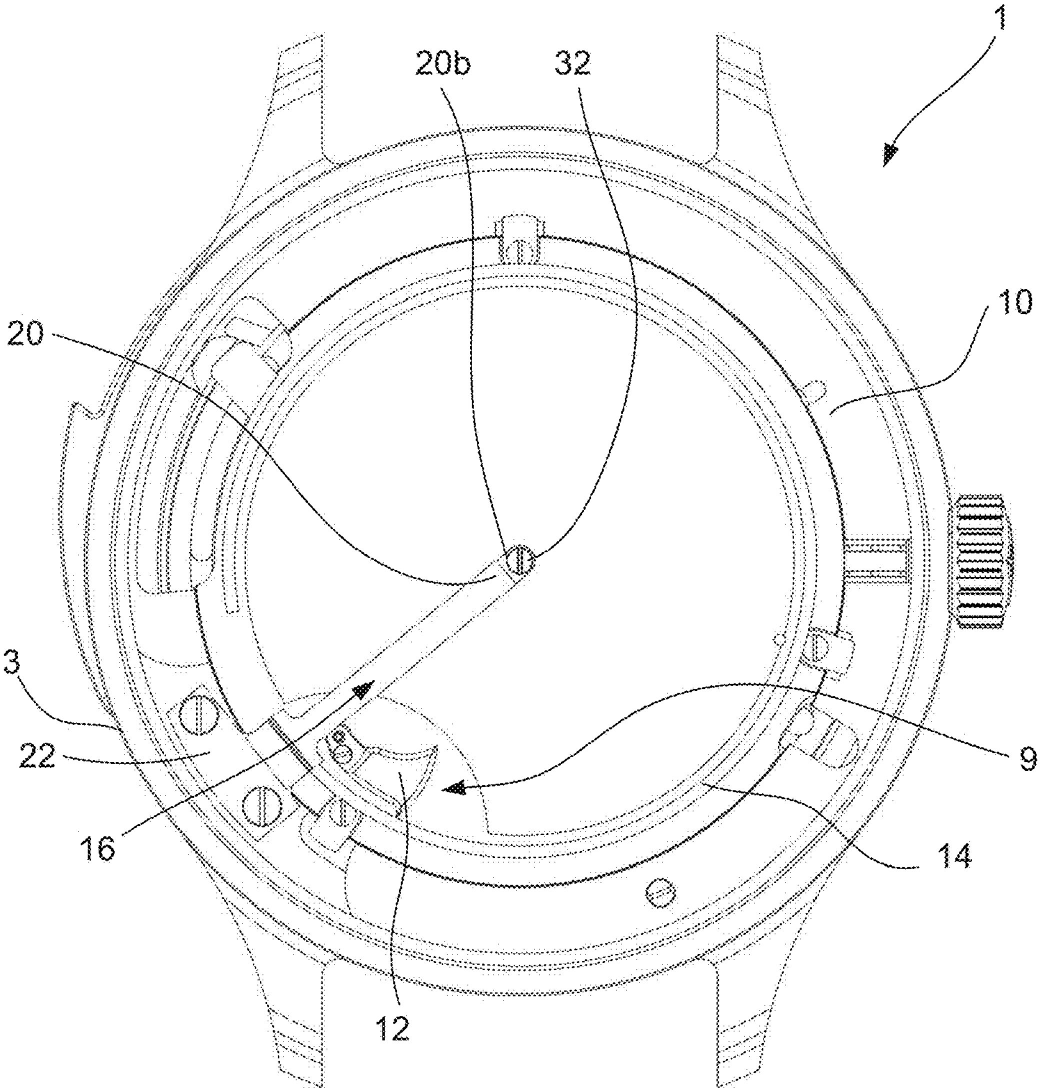
FIG. 1 is a view of the back cover of a timepiece according to a first embodiment of the invention.
Figure 2:
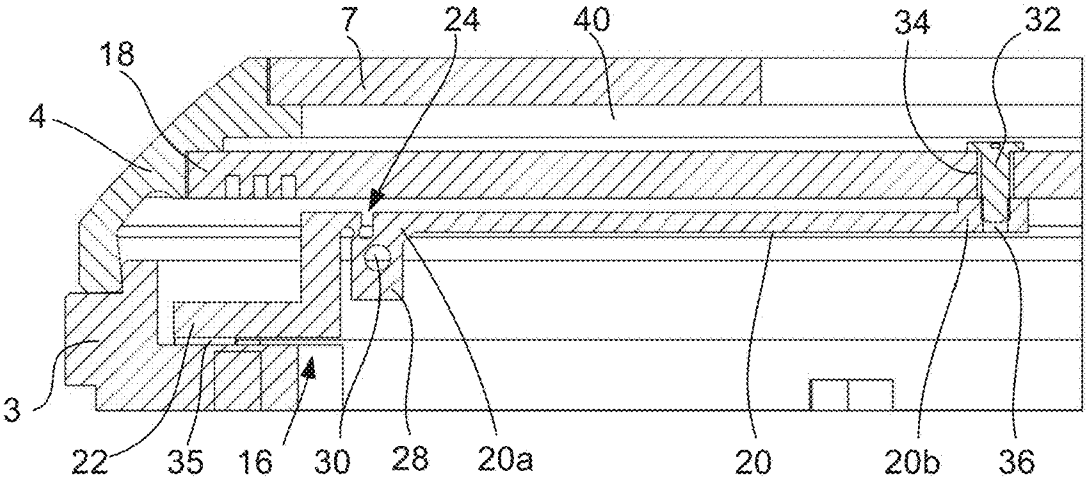
FIG. 2 is a partial, sectional view of the back cover side of the timepiece of FIG. 1.
Figure 9:
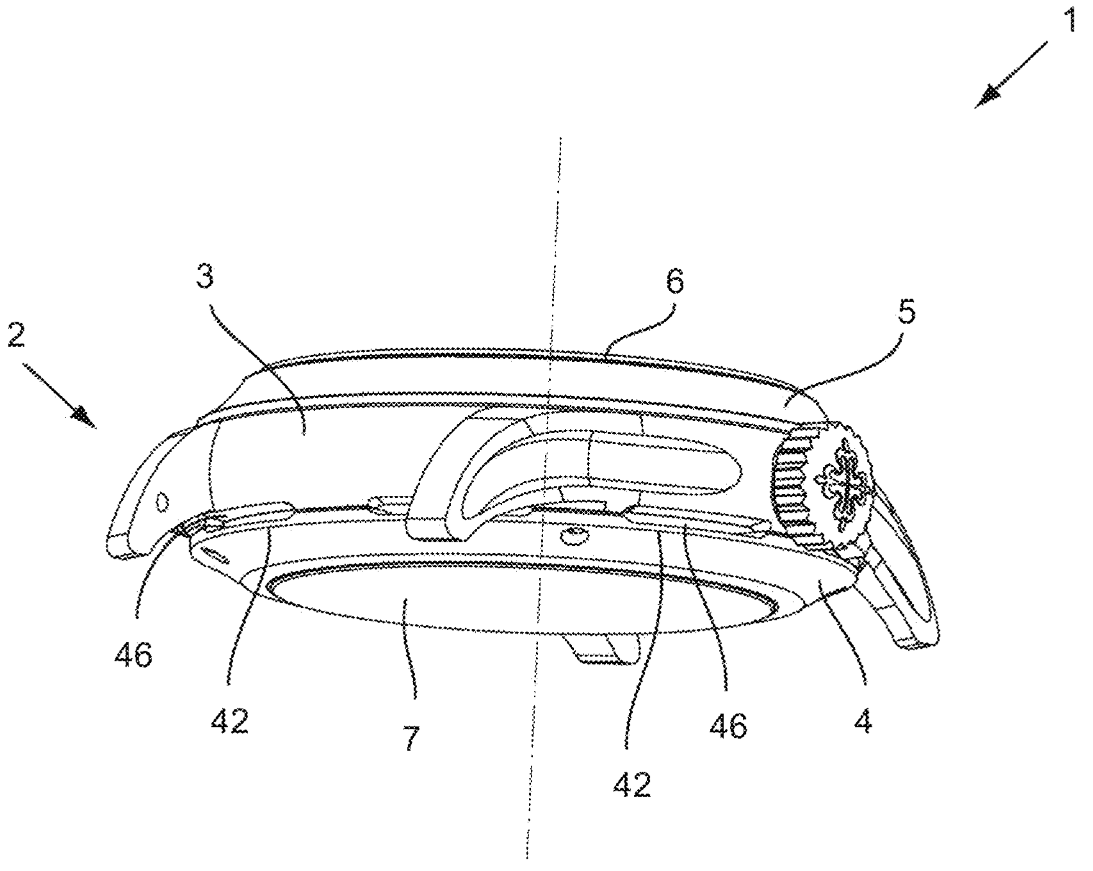
FIG. 9 is a perspective view of the timepiece according to the invention showing the closure of the openings of the compression chamber outside the sound-generating time.

With reference to FIGS. 1, 2 and 9, the watch 1 comprises a case 2 having a middle 3, a back cover 4, a bezel 5, and a first glass 6. The back cover 4 is annular and its central opening is closed by a second glass 7, the function of which will be described hereafter. The bezel and the middle may be two different parts, or form a single monobloc piece. Similarly, the back cover and the middle may be two different parts, or form a single monobloc piece.

In the following description, the vibration-amplifying device and the membrane are arranged to generate sounds through the back cover of the watch, and more particularly through the second glass 7. Quite obviously, the vibration-amplifying device and the membrane may be arranged similarly but in the reverse manner to generate sounds from the dial side of the watch, and more particularly through the first glass 6.

Figure 4:
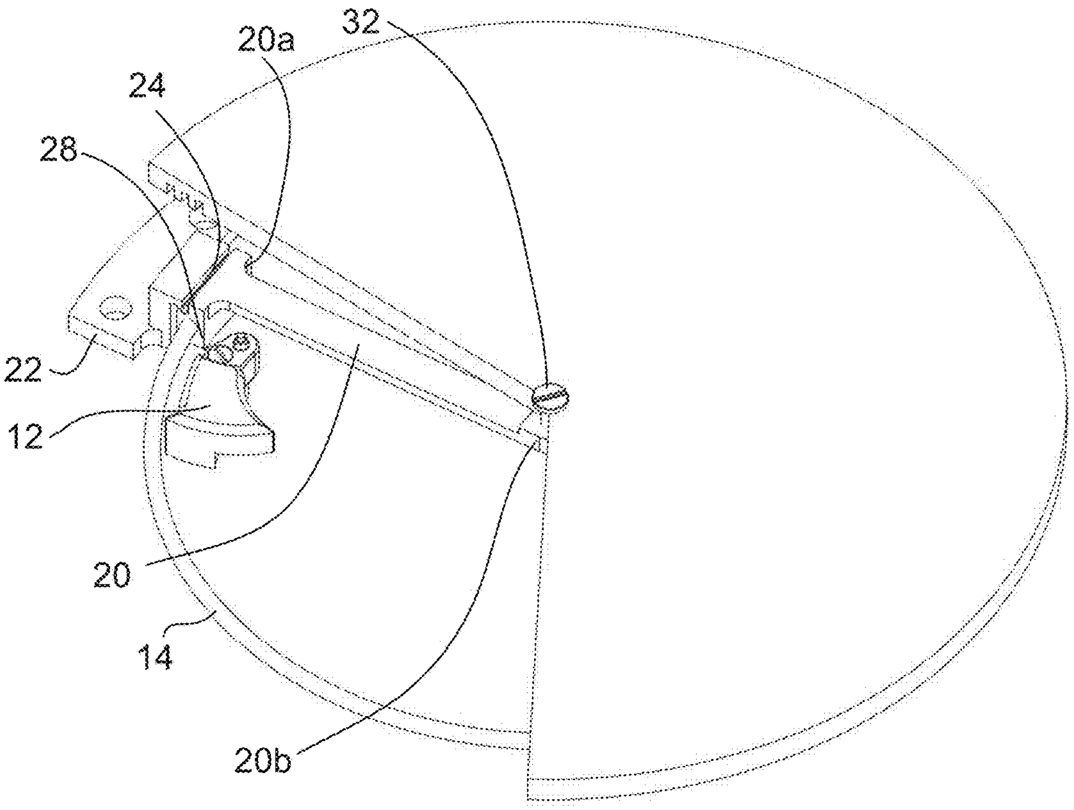
FIG. 4 is a view of the membrane and the vibration-amplifying device according to the first embodiment of the invention.

Referring more specifically to FIGS. 1, 2 and 4, the watch 1 also comprises a movement (not shown) and a striking-mechanism 9 constituting the vibration-generating device intended to produce at least one sound. The movement and striking-mechanism 9 are accommodated in the middle 3 of the case 2, mounted on a frame 10 (bottom plate and bridges). The striking-mechanism 9 comprises in known manner hammers 12 arranged to strike the strike-gong 14, in this case in the form a wire or strip spring gong wound around the movement.

In order to amplify the sounds produced by the gong 14, a device 16 is provided for amplifying the vibrations generated by the gong 14 as well as a membrane 18 arranged to receive said amplified vibrations and generate a sound from the inside to the outside of the watch. In this case, the sound being transmitted from the back cover side, the membrane 18 is mounted on the back cover 4, parallel to said back cover 4, between the movement and the second glass 7. The membrane will be mounted on the inside of the bezel 5, parallel to said bezel 5, between the movement and the first glass 6 when the sound is to be transmitted from the dial side.

In accordance with the invention, the vibration-amplifying device 16 comprises a lever 20 linked to a support 22 by a joint along a single axis of rotation, such that said lever 20 is tiltably or pivotally mounted on said support 22 about said axis of rotation, in a pivoting plane non-parallel to the plane of the membrane 18.

Particularly preferably, the lever 20 is pivotally mounted on its support 22 such that it tilts in a pivoting plane which is perpendicular to the plane defined by the membrane 18.

According to the first embodiment shown in FIGS. 1, 2 and 4, the lever 20 is pivotally mounted on the support 22 by way of a flexible ball joint 24. The flexible ball joint makes it possible to change the direction of the vibrations if necessary. In particular, in the case of the strike-gong, the latter has a tendency to vibrate radially, in the direction of the hammer strike. Preferably, the position of the flexible ball joint 24 of the lever 20 makes it possible to modify the direction of the radial vibrations of the gong by 90° to transform them into movements perpendicular to the plane of the membrane 18 by way of the pivoting of said lever 20.

Figure 3:
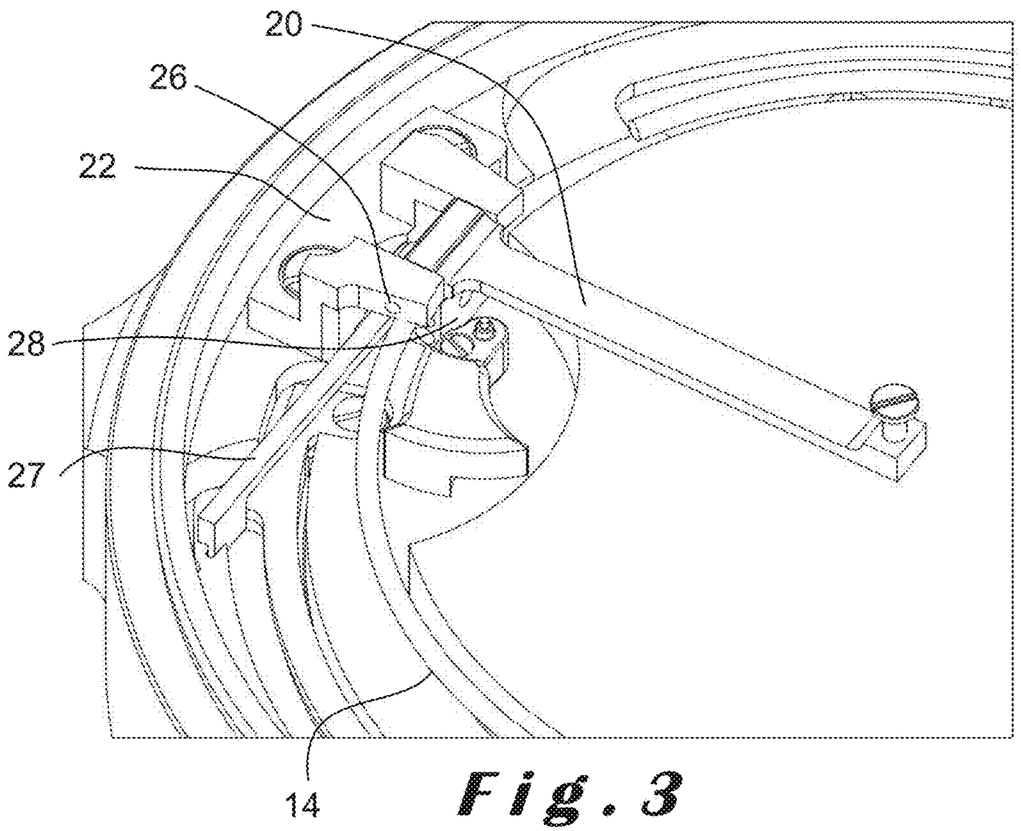
FIG. 3 is a perspective view of the back cover of a timepiece according to a second embodiment of the invention.

According to the second embodiment shown in FIG. 3, the lever 20 is pivotally mounted on the support 22 by way a pin 26 which is mounted transversely on the support 22 and constitutes the pivot axis of the lever 20. A spring 27 acts on the support 22.

The lever 20 is arranged to be actuated by a transmission member 28 cooperating with the gong 14 to transmit the vibrations to the lever 20. The transmission member 28 is preferably integral with the lever 20. It is composed, for example, of a heel or gong holder integral with the lever 20 and in which the gong 14 is mounted, for example by embedding, locking with a screw or brazing. To this end, the transmission member 28 comprises an orifice 30 into which the gong 14 is inserted. The gong 14 is thus integral with the lever 20 and is not fixed, via a heel, to the frame of the watch. The transmission member 28 may be attached to or be in one piece with the lever 20. When the lever 20 is made of steel, the gong 14, the transmission member 28 and the lever 20 may be made in one single piece.

The lever 20 is also integral with the membrane 18 at least translationally in the pivoting plane of the lever 20 in order to be capable of moving said membrane 18 in the pivoting plane of the lever 20 when it tilts. It is the linear movement of the membrane 18 moved by the lever 20 which will generate a sound.

More specifically, the lever 20 comprises a first end 20*a* pivotally mounted on the support 22 and integral with the transmission member 28 and a second end 20*b* integral with the membrane 18 at least translationally in the pivoting plane of said lever 20.

Preferably, in the case of a striking-mechanism, the transmission member 28 being fixed in relation to the gong 14, the lever 20 is translationally fixed and is fixedly linked to the membrane 18, i.e. it is rotationally and translationally integral with the membrane 18. The lever 20 can be fixed to the membrane 18 for example by way of a screw 32 screwed into a hole 34 provided on the membrane 18 and into a hole 36 provided on the lever 20, or by adhesive bonding, welding, etc.

In the case of a disc read by a needle, the lever and the needle are arranged to permit translational movement in the plane of the membrane of the lever and the needle, the lever remaining translationally integral in the pivoting plane of the membrane 18, in order to be able to move it in its pivoting plane when it tilts.

The actuation point of the lever 20 by the transmission member 28, the pivoting point of the lever 20 and the link point of the lever 20 with the membrane 18 are positioned such that a movement of the transmission member 28, generated by vibration of said transmission member 28 linked to the gong 14 and transmitted to the membrane 18 by way of the lever 20 actuated by said transmission member 28, generates an amplified movement of said membrane 18 by a mechanical lever arm effect, thereby generating an amplified sound.

Preferably, the flexible ball joint 24 is positioned on the centre of mass of the gong/lever/membrane assembly.

Preferably, the link point of the lever 20 with the membrane 18 is located at a distance from the centre of said membrane 18 which is less than 40%, preferably less than 20%, of the width of said membrane 18. Particularly preferably, the link point of the lever 20 with the membrane 18 is located at the centre of said membrane 18, in order to maximise the lever arm effect.

In another variant, the link point can be positioned at the periphery of the membrane, playing on the elasticity of the fixing point and torsion of the membrane.

Advantageously, the vibration-amplifying device, and more particularly the support 22 of the lever 20, is isolated from the movement, from the striking-mechanism 9 and from the frame 10. To this end, the support 22 of the lever 20 may be mounted on an external part and more particularly on the bezel 5 if the sound is transmitted from the dial side, or on the back cover 4, if the sound is transmitted through the back cover. Since strike-gong 14 is embedded in the transmission member 28 integral with the lever 20, said gong 14 is not fixed to the frame via a heel, as traditionally, but appears to float around the movement.

The support 22 of the lever 20 may also be mounted on the movement, or even on the middle 3, but by way of an isolating element 35, such as a polymer, in order to ensure the isolation of the support 22 from the movement, the middle and the frame.

When the support 22 of the lever 20 is mounted on one of the elements of the case (bezel 5, middle 3, back cover 4), it is likewise possible to isolate the movement from the remainder of the watch by disposing an isolating device on the movement, between the movement and said element of the case which bears support 22 of the lever 20. Such an isolating device may be for example a brass ring associated with a flat gasket or an isolating ring of carbon-filled polyether ether ketone (PEEK). For example, in order to isolate the movement, the latter may be flanged onto a PEEK isolation ring which is itself screwed into the case middle.

When the support 22 of the lever 20 is mounted on the bezel 5, or on the back cover 4, said bezel 5, or said back cover 4, may be conventionally assembled directly on the middle 3. However, in order to ensure that no unwanted vibration arrives at the middle 3 and therefore at the movement, said bezel 5, or said back cover 4, is assembled on the middle 3 by way of an isolating element, such as a polymer.

The membrane 18 is mounted on the back cover 4, if the sound is transmitted through the back cover, or the bezel 5 if the sound is transmitted from the dial side. Thus, the membrane 18 is also isolated from the movement and the striking-mechanism 9.

Consequently, the vibration-amplifying device and the membrane are isolated from the movement and the frame such that all the vibrations of the gong recovered by the lever 20 are directed and transmitted to the membrane 18, without transmission to the movement, the frame or the middle.

The lever 20 is preferably made from a very light and very rigid material. For example, the lever 20 may be made of steel, titanium, aluminium, magnesium, composite material, carbon, glass, sapphire and ceramic.

The membrane 18 must be able to vibrate freely. It is preferably made from a very light and rigid material in order have a large dynamic response and not to deform when it moves. The membrane 18 is preferably made of a transparent material. For example, the membrane 18 may be made in the form of a plate of sapphire, mineral glass, Plexiglas®, etc. The membrane 18 may thus be constituted by a third internal glass disposed under the second glass 7 (or the first glass 6, as applicable). The membrane 18 may also be made of composite materials, cellulose, or composite glass of the safety glass type. Quite obviously, the membrane 18 may also be made of a material which is not totally transparent, such as translucent or opaque materials, such as metallic glass, titanium, silicon, ceramic, carbon fibre composite, cellulose or Kevlar.

The membrane 18 must be as rigid and as light as possible. To this end, its thickness is less than 1 mm, preferably less than 0.5 mm and more preferably less than 0.3 mm.

Figure 5:
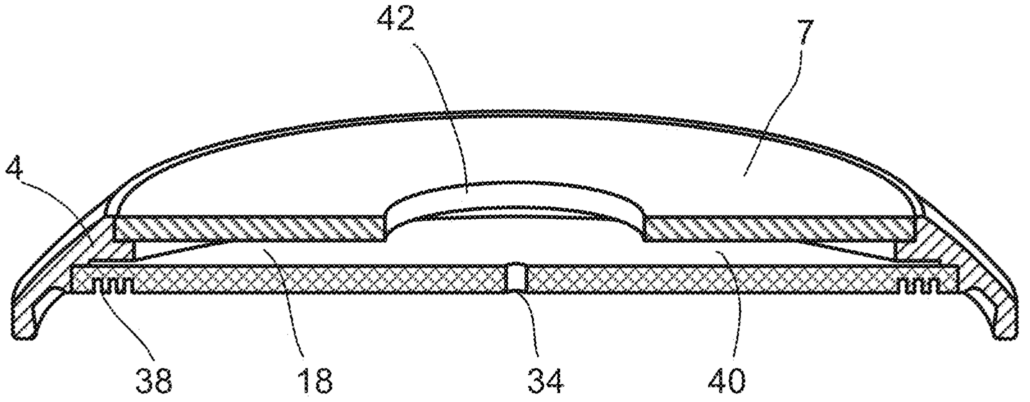
FIG. 5 is a sectional view of the membrane and the compression chamber.

Referring more specifically to FIG. 5, the membrane 18 is preferably mounted on a suspension to allow it to vibrate freely while ensuring tightness. The suspension may be provided by way of a moulded gasket disposed around the membrane 18 or an O-ring gasket disposed on the periphery on either side of the membrane 18, between said membrane 18 and the back cover 4 (or the bezel 5, as applicable). It is likewise possible to texture the membrane 18 to improve its flexibility, for example by way of grooves 38 provided on the periphery of the membrane 18. It is also possible to play on the thickness of the membrane 18.

Advantageously, the timepiece further comprises a compression chamber 40 which is arranged to amplify the sound which has been generated by the movement of the membrane, which has already been amplified a first time, before it emerges to the outside.

The compression chamber 40 is closed by a wall disposed downstream of the membrane 18 and having at least one opening 42 directed towards the outside of the timepiece. The dimensions of the opening 42 are selected in relation to the surface area of the membrane 18 as a function of the desired sound amplification.

Preferably, when the membrane 18 is disposed on the back cover 4, said wall is constituted by the second glass 7. Said second glass 7 must be strong and scratchproof. It is preferably made of sapphire.

The wall disposed downstream of the membrane 18 makes it possible to generate a certain volume of air in the compression chamber 40. Movement of the membrane 18 compresses this air. The ratio between the surface area of the moving membrane 18 which defines the volume of air and the size of the openings will make it possible to achieve a second amplification of the sound.

The opening 42 may take various forms: a hole in the centre of the wall, in this case the second glass 7, a plurality of lateral holes, a multitude of micro-holes, etc. The shape of the outlet opening may be conical to amplify the sound further. Advantageously, the opening 42 may take the form of one or more longitudinal grooves extending around the middle, parallel to the plane of the movement, and obtained by leaving a space for example between the back cover 4 and the middle 3 if the membrane 18 is disposed on the back cover 4, as shown in FIG. 9. Such lateral openings 42 advantageously make it possible to redirect the sound generated by the membrane 18 onto the wristwatch wearer's arm, giving said wearer the sensation of even further amplified sound.

Figure 6:
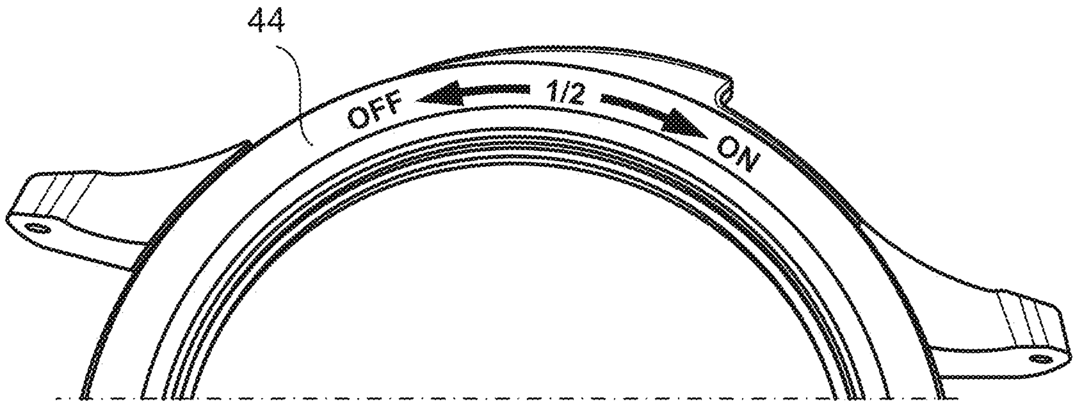
FIG. 6 is a view of the means for adjusting the volume of the sound generated by the membrane.
Figure 7:
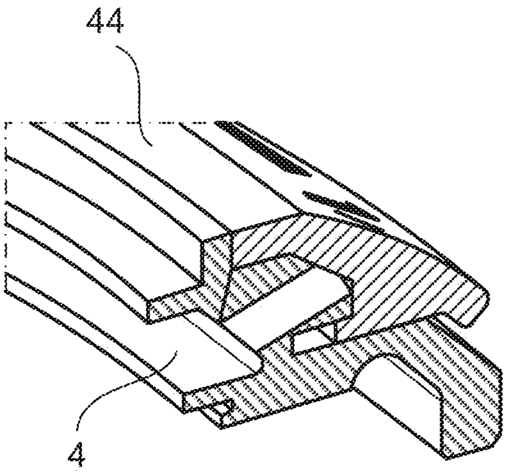
FIGS. 7 and 8 are partial, sectional views respectively showing the volume-adjusting means in the closed position and the open position.
Figure 8:
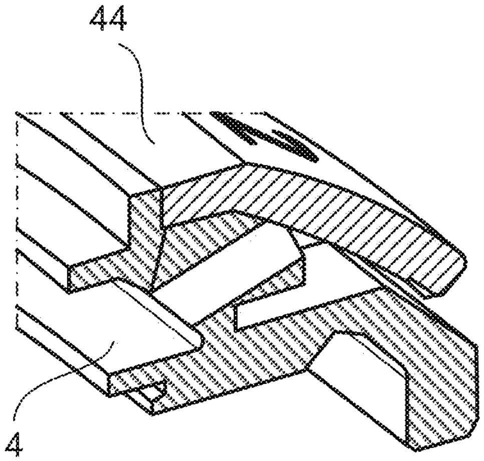

With reference to FIGS. 6 to 8, the timepiece advantageously comprises adjustable closure means 44 of the opening 42 of the compression chamber 40 which are arranged to make it possible to adjust the volume of sound generated by the membrane 18. These closure means 44 are arranged to be movable between a closed position in which the opening 42 is entirely closed and an open position in which the opening 42 is at its largest, the intermediate positions allowing the opening 42 to be blocked to a greater or lesser extent in order to adjust the sound volume. For example, when the opening 42 is a lateral opening, the closure means 44 may comprise a rotary element such as a ring, mounted rotatably on the back cover 4, and arranged to rotate between a closed position in which the opening 42 is entirely blocked, as shown in FIG. 7, and an open position in which the opening 42 is at its largest, as shown in FIG. 8.

Advantageously, the opening 42 may be protected by an air-permeable and water-proof filter, in order to prevent impurities from entering the compression chamber 40. Such filters are known to a person skilled in the art.

Advantageously, and with reference to FIG. 9, the timepiece may comprise a mechanism for closing the opening 42 of the compression chamber 40 arranged to close said opening 42 once the sound has been generated, for example outside the striking time. Such a mechanism makes it possible to limit the ingress of impurities when the vibration-generating device is not in use. In particular, when the opening 42 is a side opening, the closing mechanism may comprise a closing member 46, such as a ring, controlled by the striking-mechanism so as to close the opening 42 automatically once striking is complete. Such a mechanism is described, for example, in patent CH 704 940, which is incorporated by reference.

When the membrane 18 is disposed on the back cover 4 and sound is generated from the back cover side, it is also possible to provide a reflector, arranged to allow the generated sound to rise up the side of the watch. Such a reflector is for example positioned on the outside of the back cover, and has conical outer walls surrounding the back cover and directed towards the watch.

The timepiece according to the invention enables significant sound amplification: the ratio of the first amplification performed by way of the lever 20 is of the order of 10 to 16. Furthermore, due to the ratio between the moving surface area of the membrane 18 and the opening 42 (surface area ratio of 20 to 30), the second amplification ratio is of the order of 1.5. The total amplification ratio achieved by the watch according to the invention is such that a sound greater than 80 dB, or even 90 dB, may be obtained, as compared to a standard minute-repeater sound of 60 dB.

Furthermore, the construction and mounting of the amplification device make it possible to isolate the vibration-generating device and the membrane from the movement, the frame and the middle, such that all the vibrations are directed onto the membrane by way of the lever without passing via the movement. Little, or even no, unwanted sound generally associated with the vibration of movement components is thus obtained.

Furthermore, the striking power on the gong may be increased without having any impact on the vibration of components in the movement.

Moreover, since the amplification device with the membrane is integral with the back cover or the bezel, the movement and the gongs can be easily accessed for adjustment simply by disassembling the back cover or the bezel.

Finally, the construction of the amplification device with the membrane is such that tightness of the case has no impact on sound volume, unlike all other minute-repeater principles, for example. This is because the membrane with its suspension makes the system leaktight with the exception of the compression chamber 40. The latter may be made leaktight by a filter system.

The invention claimed is:

1. A timepiece comprising a case having a middle, a back cover and a bezel, a movement and a vibration-generating device intended to produce at least one sound, the movement and the vibration-generating device accommodated in said case, a vibration-amplifying device for amplifying vibrations generated by said vibration-generating device, and a membrane arranged to receive said vibrations and generate a sound from the inside to the outside of the timepiece, wherein said vibration-amplifying device comprises a lever pivotally mounted on a support in a pivoting plane non-parallel to a plane of the membrane and arranged to be actuated by a transmission member cooperating with the vibration-generating device to transmit the vibrations to the lever, said lever likewise being integral with the membrane at least translationally in the pivoting plane such that a movement of the transmission member, generated by a vibration of said transmission member linked to the vibration-generating device and transmitted to the membrane by way of the lever actuated by said transmission member, generates an amplified movement of said membrane, so as to generate an amplified sound, wherein the lever is pivotally mounted on the support by way of a pin or a flexible ball joint.

2. The timepiece according to claim 1, wherein the vibration-amplifying device is isolated from the movement.

3. The timepiece according to claim 2, wherein the support of the lever is mounted on the bezel, on the back cover, or on the movement by way of an isolating element between the movement and the support.

4. The timepiece according to claim 2, wherein the pivoting plane of the lever is perpendicular to the plane of the membrane.

5. The timepiece according to claim 1, wherein the support of the lever is mounted on the bezel, on the back cover, or on the movement by way of an isolating element between the movement and the support.

6. The timepiece according to claim 5, wherein, when the support of the lever is mounted on one of the bezel and the back cover, and wherein the one of the bezel and the back cover on which the support is mounted is assembled on a middle by way of the isolating element.

7. The timepiece according to claim 5, wherein the pivoting plane of the lever is perpendicular to the plane of the membrane.

8. The timepiece according to claim 1, wherein the pivoting plane of the lever is perpendicular to the plane of the membrane.

9. The timepiece according to claim 1, wherein the lever comprises a first end pivotally mounted on the support and integral with the transmission member and a second end integral with the membrane at least translationally in the pivoting plane.

10. The timepiece according to claim 1, wherein a link point of the lever with the membrane is located at a distance from a centre of said membrane which is less than 40% of a width of said membrane.

11. The timepiece of claim 10, wherein the link point of the lever with the membrane is located at a distance from the centre of said membrane which is less than 20% of the width of said membrane.

12. The timepiece of claim 11, wherein the link point is located at the center of the membrane.

13. The timepiece according to claim 1, further comprising a compression chamber which is arranged to amplify the sound which has been generated by the movement of the membrane before the sound emerges to the outside.

14. The timepiece according to claim 13, wherein the compression chamber is closed by a wall disposed downstream of the membrane and having at least one opening, dimensions of which are selected in relation to the surface area of the membrane as a function of a desired sound amplification.

15. The timepiece according to claim 14, further comprising adjustable closure means of the opening of the compression chamber which are arranged to make it possible to adjust the volume of sound generated by the membrane.

16. The timepiece according to claim 14, further comprising a mechanism for closing the opening of the compression chamber arranged to close said opening once the sound has been generated.

17. The timepiece according to claim 1, wherein the vibration-generating device is a strike-gong arranged to be struck by a strike-hammer, said strike-gong being integral with the transmission member, said transmission member being integral with the lever.

* * * * *